(12) United States Patent
Parker et al.

(10) Patent No.: US 10,605,911 B1
(45) Date of Patent: Mar. 31, 2020

(54) MULTIBEAM RECEIVER SYSTEM AND METHOD

(71) Applicants: Alan Dale Parker, Rancho Palos Verdes, CA (US); Jeffrey M. Yang, Signal Hill, CA (US)

(72) Inventors: Alan Dale Parker, Rancho Palos Verdes, CA (US); Jeffrey M. Yang, Signal Hill, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 421 days.

(21) Appl. No.: 15/624,529

(22) Filed: Jun. 15, 2017

(51) Int. Cl.
*G01S 13/93* (2020.01)
*G01S 13/931* (2020.01)
*H01Q 3/40* (2006.01)
*H01Q 3/38* (2006.01)
*G01S 13/02* (2006.01)

(52) U.S. Cl.
CPC ............. *G01S 13/931* (2013.01); *H01Q 3/38* (2013.01); *H01Q 3/40* (2013.01); *G01S 2013/0254* (2013.01); *G01S 2013/9318* (2020.01); *G01S 2013/9321* (2013.01); *G01S 2013/93185* (2020.01)

(58) Field of Classification Search
CPC .......... G01S 13/931; G01S 2013/9321; G01S 2013/9342; G01S 2013/0254; G01S 2013/9346; H01Q 3/40; H01Q 3/38
USPC .......................................................... 342/70
See application file for complete search history.

(56) References Cited

U.S. PATENT DOCUMENTS

| | | | |
|---|---|---|---|
| 4,277,787 A * | 7/1981 | King | H01Q 25/00 342/371 |
| 5,008,678 A | 4/1991 | Herman | |
| 7,493,144 B2 | 2/2009 | Natarajan et al. | |
| 7,907,100 B2 | 3/2011 | Mortazawi et al. | |
| 8,289,203 B2 | 10/2012 | Culkin et al. | |
| 2007/0008211 A1* | 1/2007 | Yamano | G01S 13/589 342/70 |
| 2014/0062763 A1* | 3/2014 | Kishigami | G01S 13/42 342/158 |
| 2014/0172266 A1* | 6/2014 | Labuhn | B60W 30/16 701/96 |

(Continued)

OTHER PUBLICATIONS

Parker, et al.: "*Multibeam Transmitter System and Method*"—corresponding application being filed simultaneously herewith.

*Primary Examiner* — Timothy A Brainard
(74) *Attorney, Agent, or Firm* — Tarolli, Sundheim, Covell & Tummino LLP (57) ABSTRACT

A system includes a controller having a processor and a memory. The processor executes computer-executable instructions stored in the memory to operate the controller. The instructions cause the controller to determine at least two beam patterns for separate scanning receive beams that operate within a field of regard to be scanned by a Radio Detection and Ranging (RADAR). The instructions cause the controller to generate beam pattern commands to form the separate scanning receive beams based on the determined beam patterns, the beam pattern commands specify an azimuth beamwidth and a pointing direction for each of the separate scanning receive beams that operate within each portion of the field of regard.

18 Claims, 9 Drawing Sheets

(56) References Cited

U.S. PATENT DOCUMENTS

| | | | | |
|---|---|---|---|---|
| 2015/0323659 A1* | 11/2015 | Mitchell | ............ | G01S 13/9307 |
| | | | | 342/41 |
| 2017/0160389 A1* | 6/2017 | Vacanti | ............ | G01S 7/03 |
| 2017/0363738 A1* | 12/2017 | Kaino | ............ | G01S 13/32 |
| 2018/0031695 A1* | 2/2018 | Carswell | ............ | G01S 13/9023 |

* cited by examiner

MULTIBEAM RECEIVER SYSTEM AND METHOD

TECHNICAL FIELD

This disclosure relates to vehicle assist systems, and more particularly to multi-beam signal receivers to facilitate data collection capabilities for a vehicle.

BACKGROUND

Many modern vehicles include radar scanning systems to assist the vehicle in such applications as automated emergency breaking (AEB) to stop the vehicle when objects are detected in a given vehicle's path. Traditional non-scanning radar receivers observe the entire system field of regard (e.g., area where objects are to be detected) and collect backscatter (e.g., reflections of transmitted energy) from objects in the field of regard. Typical scanning receiver operation is to scan successive adjacent regions at a fixed scan rate, starting on one edge of the instantaneous field of view, moving the beam such that the edge of the beam slightly overlaps the previous field of view, and so on until the entire system field of regard has been scanned.

In a scan time example for a typical receiver, assuming a frame rate of 20 frames per second (FPS), each field of regard should be sequentially scanned within 50 msec. With azimuth only scan, with field of regard of 60 degrees, and field of view at 6 deg, the dwell time is about 5 msec at each beam position in the field of regard. The minimum dwell time at each beam position is governed by system accuracy requirements. Wider fields of regard reduce the dwell time at each position. As dwell time decreases, the amount of data collected at each field of view position within the field of regard decreases, which can decrease the accuracy of a detection system.

SUMMARY

This disclosure relates to multi-beam signal receivers to facilitate data collection capabilities for a vehicle. In one aspect, a system includes a controller having a processor and a memory. The processor executes computer-executable instructions stored in the memory to operate the controller. The instructions cause the controller to determine at least two beam patterns for separate scanning receive beams that operate within a field of regard to be scanned by a Radio Detection and Ranging (RADAR). The separate scanning receive beams include first and second scanning receive beams each having a respective beamwidth and dwell time, wherein the beamwidth of the first scanning receive beam is wider than the beamwidth of the second scanning receive beam and the dwell time of the first scanning receive beam is longer than the dwell time of the second scanning receive beam to allow the system to operate concurrently in a long-range mode and a short-range mode. The instructions cause the controller to generate beam pattern commands to form the separate scanning receive beams based on the determined beam patterns. The beam pattern commands specify an azimuth beamwidth and a pointing direction for each of the separate scanning receive beams that operate within each portion of the field of regard.

In another aspect, a system includes a beam generator for a vehicle that transmits a transmit beam over a scanning region of a field of regard in response to a beam command. A controller for the vehicle generates the beam command to the beam generator to cause the transmit beam to be directed across the field of regard. The transmit beam reflects from objects within proximity of the vehicle. A synchronizer generates beam forming commands to at least one antenna to form a plurality of receive beams and to synchronize the receive beams to the transmit beam. The beam forming commands specify a beamwidth and receiving direction for the beams formed by the antenna. The plurality of receive beams include first and second receive beams each having a respective beamwidth and dwell time. The beamwidth of the first receive beam is wider than the beamwidth of the second receive beam and the dwell time of the first receive beam is longer than the dwell time of the second receive beam to allow the system to operate concurrently in a long-range mode and a short-range mode.

In yet another aspect, a method includes generating a transmit beam over a field of regard for a vehicle in response to a beam command. The method includes synchronizing at least one antenna to form multiple receive beams in response to a beam command. The receive beams have a field of view narrower than the field of regard covered by the RADAR. The method includes scanning the receive beams across the field of regard and receiving transmit signals reflected from objects in the field of regard via the receive beams. The method includes processing the object data to determine an object's angular position in the field of regard and proximity to the vehicle. The method includes initiating an alert to the driver or initiating a vehicle corrective action for the vehicle if the object's proximity to the vehicle is determined within a predetermined proximity threshold.

DETAILED DESCRIPTION

This disclosure relates to a multi-beam receiver system and method that can be employed to provide object scanning and detection for a vehicle where vehicles can include land, sea, or aircraft vehicles, for example. This can include detecting the distance between automobiles for vehicle safety systems (automated emergency breaking), for example. A first Radio Detection and Ranging (RADAR) receive beam operates in a sub-portion of allocated scanning bandwidth, and a second receive beam operates in a different sub-portion of the allocated bandwidth to facilitate increased scanning and dwell times that can capture more data than single beam systems. This allocation of bandwidth can be extended to an N-th scanning receive beam that operates in yet a different sub-portion of the allocated bandwidth. A controller and synchronizer is provided to adjust receiver reception elements such that each element is positioned to receive signals from objects that are radiated from one or more transmit beams.

The respective receive beams are independently steerable and can scan in the same or different directions across a scan field of regard to detect the object. Each receive beam can utilize the antenna aperture and antenna elements to form the receive beam, thus each beam can have the same beamwidth. A variation of this method is to use subsets of an N×M array to form each receive beam. For each variation in beam pattern, the receiver can be commanded via direction commands to receive signals that are aligned with the generated transmit beam (or beams) if multiple transmit beams are employed to radiate a field of regard. If a single transmitter beam is employed to illuminate the field of regard, the receiver can configure the antenna array to generate multiple receive beams that are positioned to operate within the field of regard highlighted by the transmit beams. If multiple transmit beams are employed, the receiver can be synchronized to generate one more receive beams that operate within the field of regard of each transmit beam.

In one example aspect, there is at least one transmit beam where received signals can be captured in response to the transmit beam. Beam forming commands can be generated that set up multiple receive beams to monitor the area illuminated by the transmit beam (or beams). Each transmit/receive beam can operate at different frequencies in one aspect to provide diversity between beams in order to mitigate interference between beams when transmitted and received. For example, the first beam can operate between 76 and 76.5 GHz, and a second beam operates between 76.5 and 77 GHz where each beam can utilize a frequency modulated continuous wave (FMCW) chirp modulation of 500 MHz or less. Other types of beam-forming diversity can be provided between beams to mitigate potential overlap between the respective beams. In addition to frequency diversity, these beam-forming techniques can include polarization diversity (e.g., each beam directed on a different electromagnetic plane), spatial diversity (e.g., each beam directed from a different antenna), and/or waveform diversity (e.g., each beam generated via different phased weighting commands) to allow each beam to operate while not impacting the other beam(s).

Various receive and transmit beam scanning patterns can be utilized. For instance, a first receive beam scans half of the system field of regard (e.g., left hand side of scanning field), and a second receive beam scans the other half of the system field of regard where the receiver employs beam forming commands to form receive beams to receive signals from each half of the field of regard. This allows each receive beam to dwell twice as long at any single position as a single beam phased array antenna operating over the same system field of regard. In one variant, the two receive beams can be controlled in a symmetric mirror image manner and in another variant, the two receive beams operate asymmetrically. In another aspect, the first receive beam scans the entire system field of regard and the second beam independently interrogates and dwells at locations where objects have been detected. In yet another aspect, the first receive beam scans to support the adaptive cruise control (ACC) mode for the radar, and the second receive beam concurrently scans to support automated emergency breaking (AEB) mode. A single polarized transmit and/or receiver array that uses frequency separation to avoid interference can be employed to provide scanning whereas dual polarization can be employed to double the number of beams that operate within the same frequency band in another aspect. Regardless of the beam pattern that is generated, the receiver can be synchronized via beam forming commands to receive signals according to the format and direction of the generated pattern.

Figure 1:
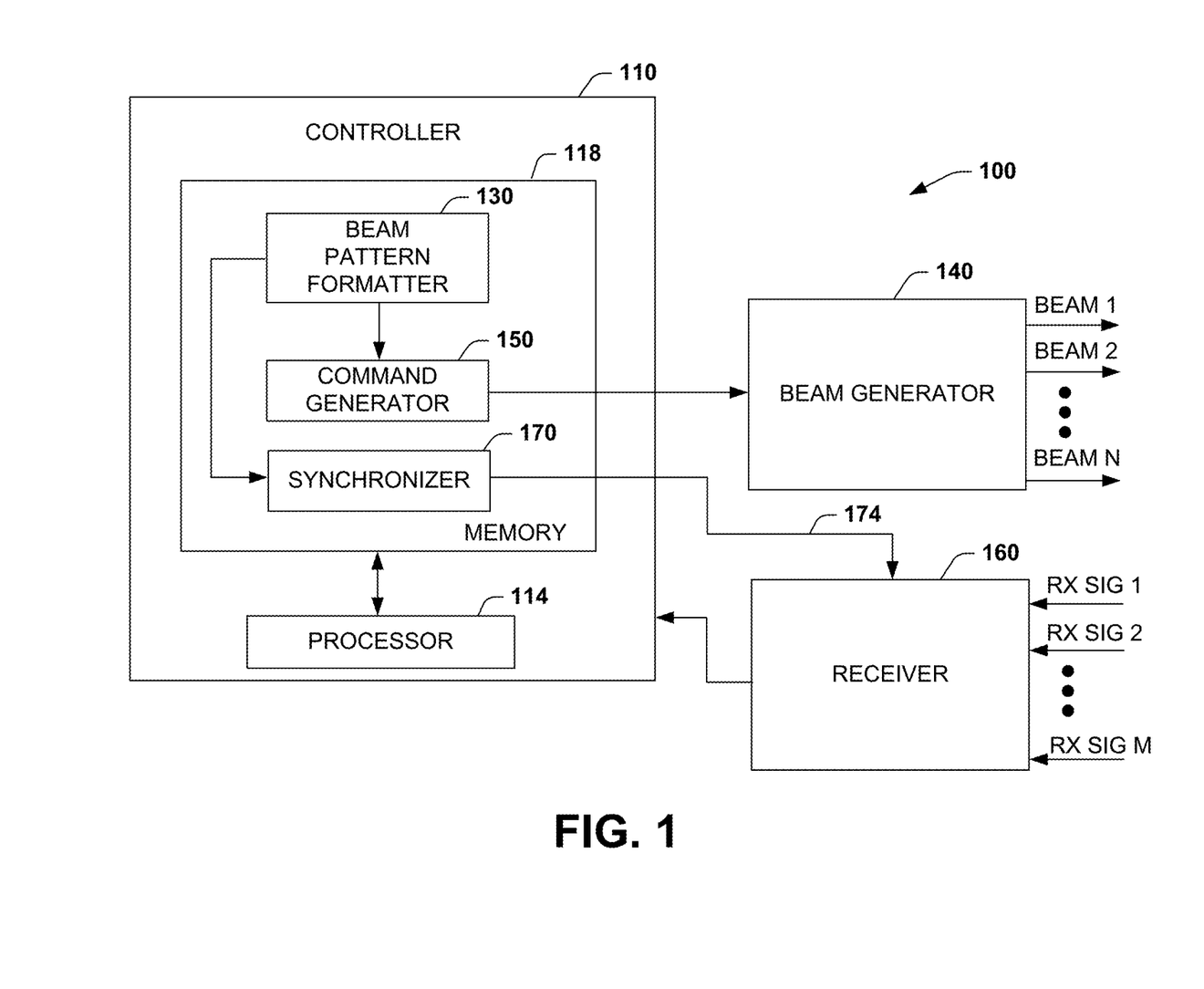
FIG. 1 illustrates an example of a multi-beam receiver system to facilitate object detection for a vehicle.

FIG. 1 illustrates an example of a multi-beam receiver system 100 to facilitate object detection for a vehicle. The system 100 includes a controller 110 having a processor 114 and a memory 118. As used herein, the term controller includes substantially any type of analog and/or digital circuit that is capable of executing instructions and having the ability to control one or more vehicle functions such as accelerating, slowing, stopping, breaking, steering, and so forth. The processor 114 executes computer-executable instructions stored in the memory 118 to operate the controller 110. The instructions in the controller 110 can include a beam pattern formatter 130 to generate one or more beam patterns that operate in one or more portions of a field of regard to be scanned by a Radio Detection And Ranging (RADAR) beam generator 140. As used herein, the term field of regard refers to the area over which the beam or beams can be scanned, shown as Beam 1 though Beam N, from the beam generator 140, where N is a positive integer. The term field of view refers to the sub-region in the field of regard that is illuminated by a transmit beam or monitored by a receive beam at any given instant. As used herein, the term "transmit beam" refers to the RADAR signal generated from the various antenna systems described herein to detect an object. The term "receive beam" is not an actual physical beam of energy as exists in a transmit beam, but is rather the term of art used to describe a region ("beam") within which a phased array antenna is able to electronically maximize its sensitivity or gain, with peak gain occurring at the centerline of the beam and the edges defining the boundary where gain rolls off below 6 dB of the peak gain, for example.

The beam pattern formatter 130 can receive input from the controller 110 based on prospective conditions for a vehicle and select differing beam patterns based on the conditions (e.g., beams selected from a database or memory). For example, in heavy traffic, short range multibeam patterns may be selected and on open highway, a combination of short and long range patterns may be selected. In one example, each of the respective patterns selected by the beam pattern formatter 130 can be selected to operate over a different portion of the field of regard encountered by a vehicle. In another example, beam patterns can be generated where one field radiates according to one polarization pattern (e.g., electric field polarization) and another field operates in a different polarization (e.g., magnetic field polarization). In a single transmit beam example, a single transmit beam can be generated by the beam generator 140 where multiple receive beams are set up to scan within the field of regard that is illuminated by the single transmit beam. Each of the receive beams can be patterned such as shown in the examples of FIGS. 4-7 described below.

After a beam pattern has been selected by the beam pattern formatter 130, a command generator 150 executed in the memory 118 generates beam pattern commands to the RADAR beam generator 140 to generate the beam patterns. The beam pattern commands specify a direction for the one or more scanning beams that operate within each portion of the field of regard. As used herein, the term direction refers to the direction of the transmit or receive beams with respect to their orientation from the front of a vehicle. The direction includes an elevation specifying an upward or downward path from the front of the vehicle from or toward the ground, respectively. The direction also specifies an azimuth referring to the leftward or rightward path of the transmit or receive beams with respect to the front of the vehicle.

A receiver 160 receives signals RX1 through RX M from the field of regard that is scanned via BEAMS 1 though N. The receiver 160 is controlled via a synchronizer 170 in the controller 110. Multiple receive beams are set up to receive reflected object data from the field of regard via signals RX1-RXM by generating beam forming commands from the synchronizer 170 to the receiver 160. The synchronizer generates direction commands 174 for multiple receive beams based on output from the beam pattern formatter 130 that describes the pattern and direction for the respective one or more transmit beams. If a single transmit beam is employed, multiple receive beams can be generated by the receiver 160 that focus on different areas of the field of regard that are illuminated by the single transmit beam. If multiple transmit beams are employed, the receiver 160 can be synchronized to form a separate receive beam that is aligned with each of the multiple transmit beams.

The receiver 160 can be synchronized via the controller 110 to scan the beams across the field of regard by forming each of the receive beams at an initial position and dwell at the initial position for a length of time specified by the controller, where the beam is then moved to a new location and dwell for a length of time specified by the controller, and successively moved to other positions until each of the receive beams have covered the field of regard. Two or more receive beams can scan across sub-regions of the field of regard. The beamwidth of one receive beam can be wider and the dwell time of the beam can be longer than the beamwidth and dwell time of another of the receive beams to allow the system 100 to operate concurrently in long range mode and short range mode. Also, if the receiver 160 receives signals from separate transmit beams, the transmit beams can be at the same frequency or at different frequencies to mitigate interference between the transmit beams. If objects are detected at positions within a field of regard scanned by the receive beams, the controller 110 can initiate a subsequent beam interrogation at about the location of the detected objects.

If a single transmit beam is employed to illuminate the field of regard, the receiver 160 can configure the antenna array to generate multiple receive beams that are positioned to operate within the field of regard highlighted by the transmit beams. If multiple transmit beams are employed, the receiver 160 can be synchronized to generate one more receive beams that operate within the field of view for each transmit beam. The direction commands 174 from the synchronizer 170 synchronize at least one antenna to receive signals with respect to multiple receive beams in response to one or more transmit beams 1-N. The direction commands 174 specify a receiving direction for the at least one antenna to generate the receive beams and receive the reflected signals from the one or more transmit beams that operate within each portion of the field of regard. In a single transmit beam example, the direction commands 174 can specify that multiple receive beams are to be generated that operate within the beam pattern generated by the single transmit beam. In a multiple transmit beam example, the direction commands 174 can specify that the receiver 160 should generate one or more receive beams that operate within the field of view of each of the respective transmit beams.

The receiver antenna can include at least one phased antenna array to receive the signals in response to the separate the one or more transmit beams. The phased antenna array utilizes separate antenna arrays to receive the signals in response to the transmit beam in one example. In another example, the phased antenna array in the receiver can include a single antenna array having antenna sub-arrays within the single antenna array to receive the signals in response to the transmit beam. Also, an antenna array can be employed where digital beam forming commands are applied to the array to generate the receive beams or the transmit beams, described herein.

In yet another example, a single antenna array receives progressive phase weight commands as the direction commands can be applied to each element of the single antenna array to receive the signals in response to the transmit beam. The progressive phase weight commands can applied to each element of the single antenna array to provide a beam forming network (BFN) to form a plane wave at a face of the antenna aperture of the single antenna array to cause a selected beam of the separate beams to be received in a desired direction. A parallel BFN can be formed to receive a subsequent beam utilizing a different set of progressive weight commands that are summed at each element of the single antenna array. In some examples, separate transmit and receive antennas can be employed where one antenna resides in the beam generator 140 and a separate receive antenna resides in the receiver 160. In another example configuration, the same antenna can be multiplexed to provide both transmit beam scanning and then multiplexed to generate receive beams that receive signals in response to the scanning transmit beams.

Output from the receiver 160 can be employed to receive reflected RADAR signals from objects in the field of regard. Output from the receiver 160 can be directed to a vehicle corrective action processor in the controller 110 to affect vehicle control based on detected activity within the field of regard. The separate receive beams can scan in the same direction in the field of regard in one example or scan in opposite directions in the field of regard based on the beam forming commands in another example. One beam of the multiple receive beams can be generated for a close range field of view with respect to a vehicle and another of the receive beams can be generated for a far range field of view that extends a farther scanning distance than the close range field of view based on the beam commands. The receive beams can be generated at different frequencies based on the beam forming commands to mitigate interference between the beams. Also, the receive beams can be generated at different electromagnetic planes that include an electrical field plane and a magnetic field plane which is transverse to the electrical field plane to mitigate interference between the receive beams. A combination of frequency and electromagnetic plane wave generation can be concurrently applied to generate the receive beams. Data can be received from and synchronized from each variation of beam pattern, frequency, and or polarization. Example beam patterns from which signals can be received as described herein are illustrated and described with respect to FIGS. 4 through 8 below.

Figure 2:
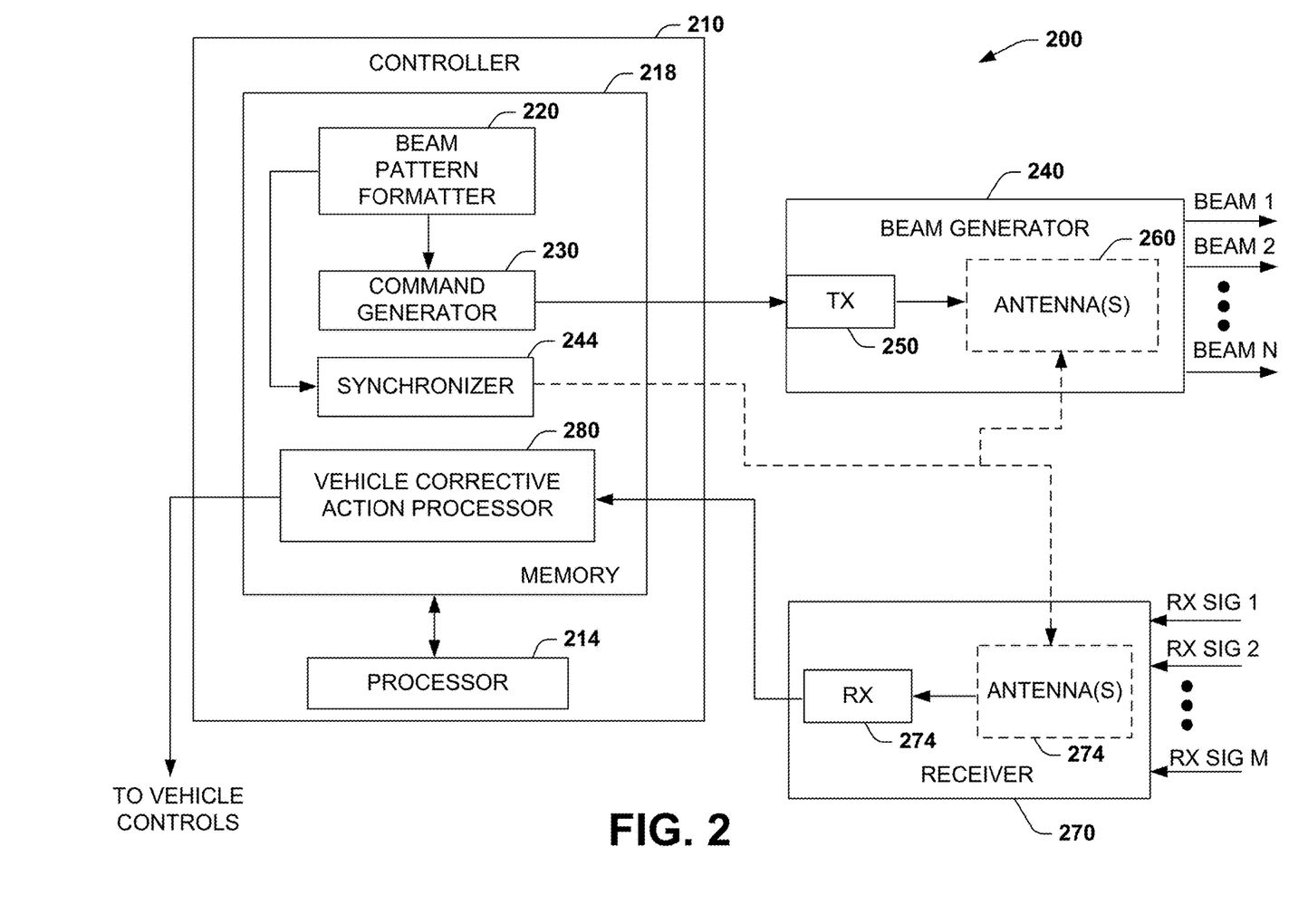
FIG. 2 illustrates an example of a multi-beam transmitter and receiver system to facilitate object detection for a vehicle.

FIG. 2 illustrates an example of a multi-beam transmitter and receiver system 200 to facilitate object detection for a vehicle. The system 200 includes a controller 210 having a processor 214 and memory 218. Similar to the system described above, the controller 210 can include a beam pattern formatter 220 to provide beam patterns to a command generator 230 to generate beam commands (or command) to a beam generator 240. Output from the beam pattern formatter 220 can drive a synchronizer 244 to generate synchronizer commands to format receive beams that orient respective antennas described herein to the pattern of transmit beams in the field of regard if multiple transmit beams are employed. In a single transmit beam example, multiple receive beams can be formed to scan within the field of regard that is illuminated by the single transmit beam. The synchronizer 244 generates commands (e.g., direction commands) to synchronize at least one antenna to receive signals in response to the transmit beam (or beams). The commands specify a receiving direction for the at least one antenna to receive each of the signals from each portion of the field of regard in which the multiple receive beams are formatted. The beam generator 240 includes a transmitter (or transmitters) (TX) 250 that receives the beam commands from the command generator 230 and excites one or more antennas 260 based on the beam commands to generate one or more transmit beams shown as Beams 1 though N. As noted above, the antenna 260 can include one or more phased antenna arrays.

At least one receiver 270 can be employed to form multiple receive beams to receive reflected Radio Detection And Ranging (RADAR) signals RX SIG 1 though RX SIG M from objects in the field of regard that are radiated by the Beams 1 though N. The receiver 270 can include a separate receive antenna 274 in one example. In another example, the receiver can utilize the antenna 260 in the beam generator 240 in multiplexed mode. Dashed lines are shown between the synchronizer and the respective antennas 260 and 274 to indicate that in some configurations separate antennas may be employed from transmitting beams and receiving signals in response to the beams while in other configurations, the same antenna 260 may be employed for both transmitting and receiving. Thus, the receiver 270 can form receive beams in response to the synchronizer commands that receive the reflected RADAR signal via a separate receive antenna 274 in the receiver 270 or via the phased antenna array 260 of the beam generator 240. Thus, in one example, beam generation and receiving can consist of a single antenna that can change between transmit and receive mode in a duty cycled fashion (e.g., N % of the time transmit, (100-N) % of the time receive). In another configuration, beam generation and receiving consists of at least two antennas where each antenna is dedicated to either transmit or receive mode (e.g., 100% of the time transmit, 100% of the time receive). For both configurations, the progressive phase weights described herein for transmit and receive modes may be set differently and thus may be updated accordingly.

The receiver 270 notifies the controller 210 via a receiver circuit shown as RX 274 of detected objects in the field of regard to enable the controller to initiate a vehicle corrective action. The controller 210 includes a vehicle corrective action processor 280 to control at least one vehicle control based on the vehicle corrective action. The vehicle control can include breaks, steering, acceleration controls, cruise control settings, and so forth. The vehicle corrective action processor 280 can initiate various vehicle corrective applications based on the determined vehicle corrective action. This can include initiating an Automated Emergency Braking (AEB) application to stop or slow a vehicle in response to the vehicle corrective action. This can also include initiating an Automated Emergency Steering (AES) application to steer the vehicle in response to the vehicle corrective action. An Adaptive Cruise Control (ACC) application can be supported to adjust a cruising speed for the vehicle in response to the vehicle corrective action. A Collision Warning (CW) application can be provided to warn an operator of the vehicle in response to the vehicle corrective action. A Lane Departure Warning (LDW) application can be supported to warn the operator of a detected lane change for the vehicle in response to the vehicle corrective action. In yet another example, a Lane Keeping Assist (LKA) application can be provided to help the vehicle maintain a given lane in response to the vehicle corrective action from the vehicle corrective action processor 280.

Figure 3:
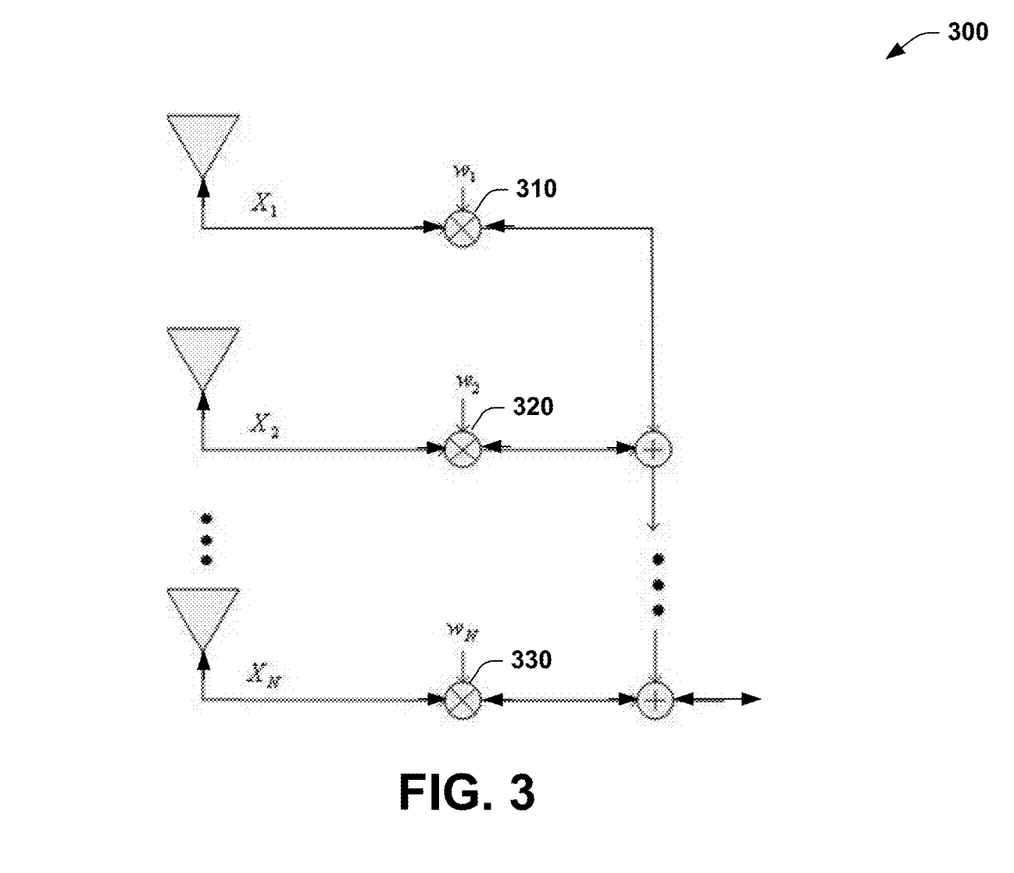
FIG. 3 illustrates an example of a phased antenna array to facilitate object detection for a vehicle.

FIG. 3 illustrates an example of a phased antenna array 300 to facilitate object detection for a vehicle. As shown, the phased antenna array includes array elements X1 though XN, with N being a positive integer. Direction arrows show that the elements X1 though XN can be employed as both transmitter elements and receiver elements depending to the selected configuration described herein. Each of the array elements X1-XN can be excited by phased weight summing junctions 310 though 330 which receive phase weight commands w1 though wN. As shown, each succeeding antenna element after X1 receives a progressive phase weight that includes the summed phase weights from the previous element stages. The progressive phase weights are employed to generate constructive and destructive patterns which cause a beam to form in a given direction as described herein.

If a plane wave is incident upon an antenna array, the phase of the signal at the antennas will be a function of the angle of arrival of the plane wave at the receiver. If the signals are then added together, they may add constructively or destructively, depending on the phases. If the signal from each antenna element were multiplied by a complex phase (weights of phased array) that cancelled out the phase change due to the propagation of the wave, then when the signals from each antenna are added together to form the output of the array, and thus they would combine coherently. This is the fundamental principle used in phased arrays—also known as beam steering. With respect to transmitters, progressive phase weight (e.g., mathematically calculate based on the relative position of the element in the array) is applied to each element in the array antenna Beam Forming Network (BFN) to form a plane wave at the face of the antenna aperture that propagate in a desired direction (e.g., beam scanning). To form subsequent beams, parallel BFNs with a different set of progressive phase weights can be implemented, and their output summed at each of the radiating elements. By superposition principle, the system can then concurrently produce multiple beams that radiate in different directions in space. The controllers described herein apply the progressive phase weights to each transmit/receive beam pair so that they are pointing/receiving in the desired direction.

In addition to the other array excitation and receiving schemes described herein, digital beam forming techniques may also be applied to the antenna array to generate the separate transmit and/or receive beams described herein. Thus, an antenna array can be provided where digital beam forming commands are applied to the array to generate the separate receive beams, for example. As noted above, in beam forming, both the amplitude and phase of each antenna element can be controlled. Combined amplitude and phase control can be used to adjust side lobe levels and steer nulls more suitably than can be achieved by phase control alone. The combined relative amplitude and phase shift for each antenna is called a "complex weight" and is represented by a complex constant wk (for the kth antenna). A beam former for a radio transmitter applies the complex weight to the transmit signal (shifts the phase and sets the amplitude) for each element of the antenna array. In digital beam forming, the operations of phase-shifting and amplitude scaling for each antenna element, and summation for transmitting and/or receiving, are performed digitally. General-purpose digital signal processors (DSP's) (or dedicated beam forming chips) can be used for such processing.

Figure 4:
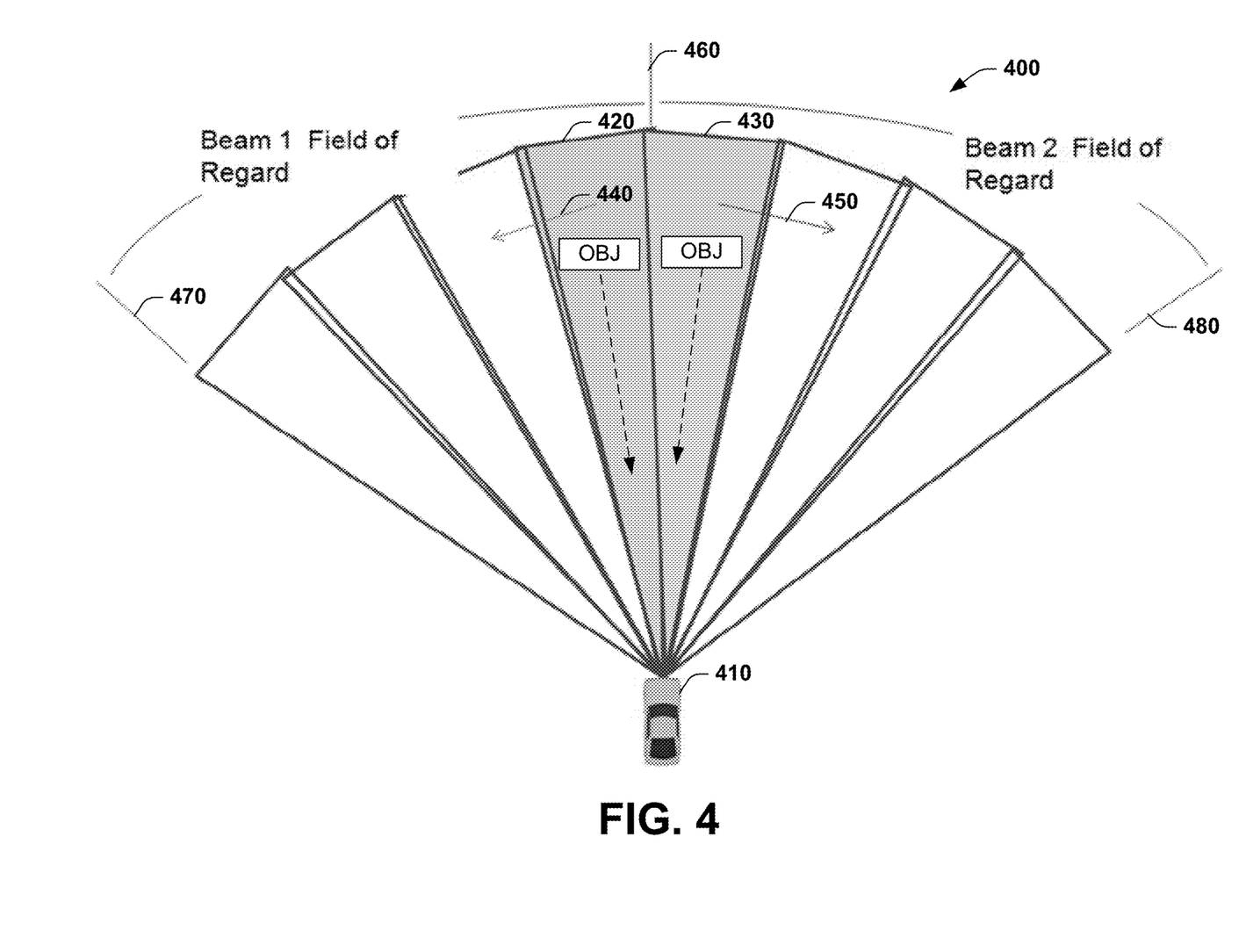
FIG. 4 illustrates an example of a transmitter and receiver multi-beam scanning pattern where each beam propagates and is received in different directions across a field of regard.

FIG. 4 illustrates an example of a transmitter and receiver multi-beam scanning pattern 400 where each beam propagates and is received in different directions across a field of regard. In this example, a vehicle 400 forms two receive beams 420 and 430 that start at the positions shown with respect to the front of the vehicle. Scan arrows 440 and 450 show how the respective receive beams are steered in opposite directions from a centerline 460. Each time a beam is steered to another location according to the directions indicated, a predetermined dwell time is set such that the beams can be positioned in the respective location in order to collect object data from the given location. The receive beams 420 and 430 are moved along an azimuth direction with respect to the front of the vehicle 410 until reaching a final beam location for each beam shown at 470 and 480, respectively. After dwelling at the end points 460 and 470, the scanning beam patterns can repeat beginning at locations 420 and 430, respectively. Dotted return arrows within the scanning beams represent signals that are received in response to a transmit beam (or beams) being reflected from detected objects (OBJ). The synchronizer described herein directs receive antennas via beam forming commands (e.g., phase weights) to be positioned such that the signals can be received from a similar direction as the generated transmit beam (or beams).

Figure 5:
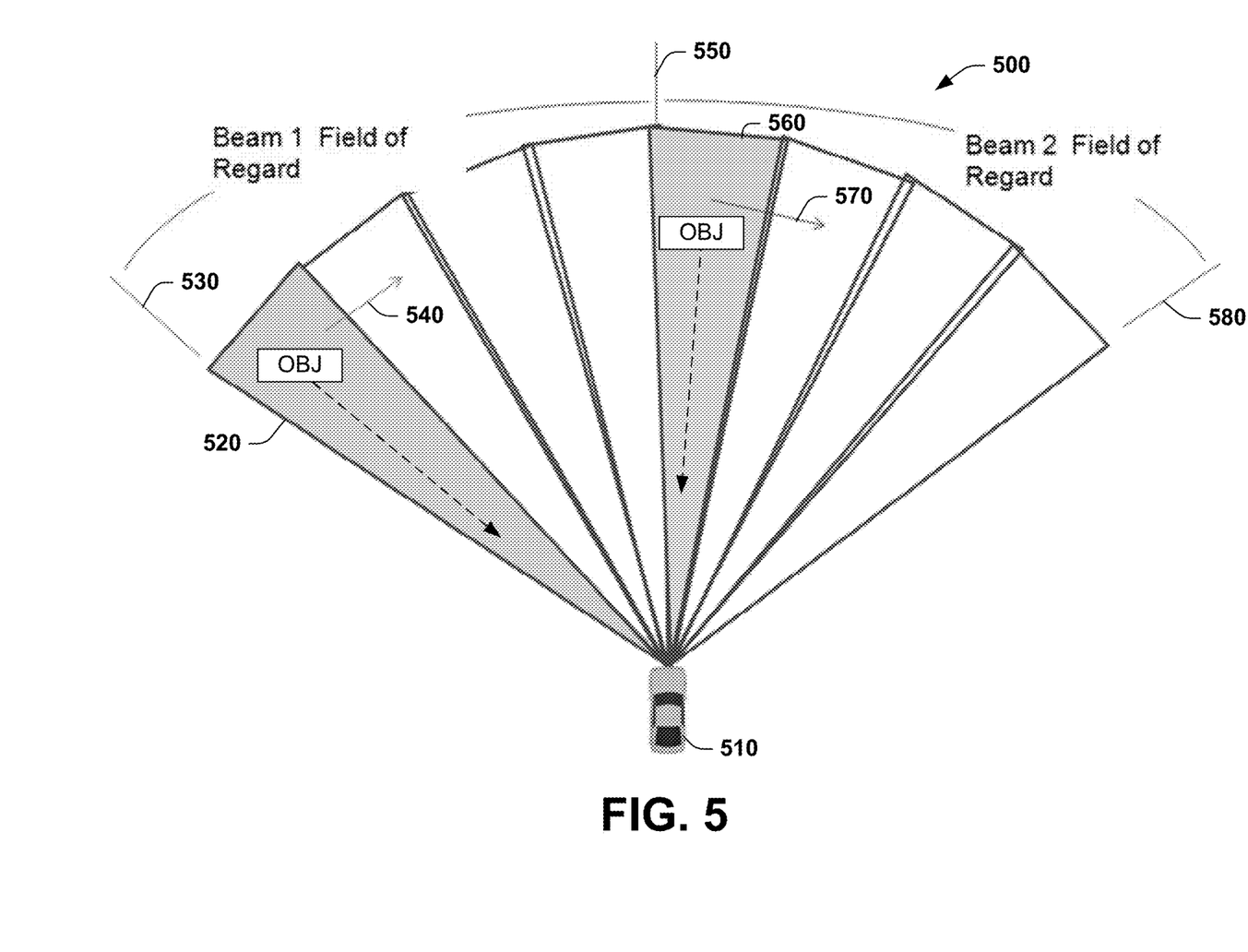
FIG. 5 illustrates an example of a transmitter and receiver multi-beam scanning pattern where each beam propagates and is received in similar directions across a field of regard.

FIG. 5 illustrates an example of a transmitter and receiver multi-beam scanning pattern 500 where each beam propagates and is received in similar directions across a field of regard. In this example, a vehicle 510 having a receiver forms a receive beam pattern where a first beam 520 starts at position 530 and is steered in the direction of arrow 540 across several dwell locations until reaching a stopping location 550. A second beam 560 starts at position 550 and is steered in the direction of arrow 570 across several dwell locations until reaching a stopping location 580. After beam the first beam 520 and the second beam 560 reach their respective end locations 550 and 580, respectively, the beam pattern repeats from the beginning 530 and 550, respectively. As can be appreciated, more than two receive beams can be generated where each beam operates within a smaller field of regard than the examples illustrated herein. Dotted return arrows within the scanning beams represent signals that are received in response to the transmit beam (or beams) being reflected from detected objects.

Figure 6:
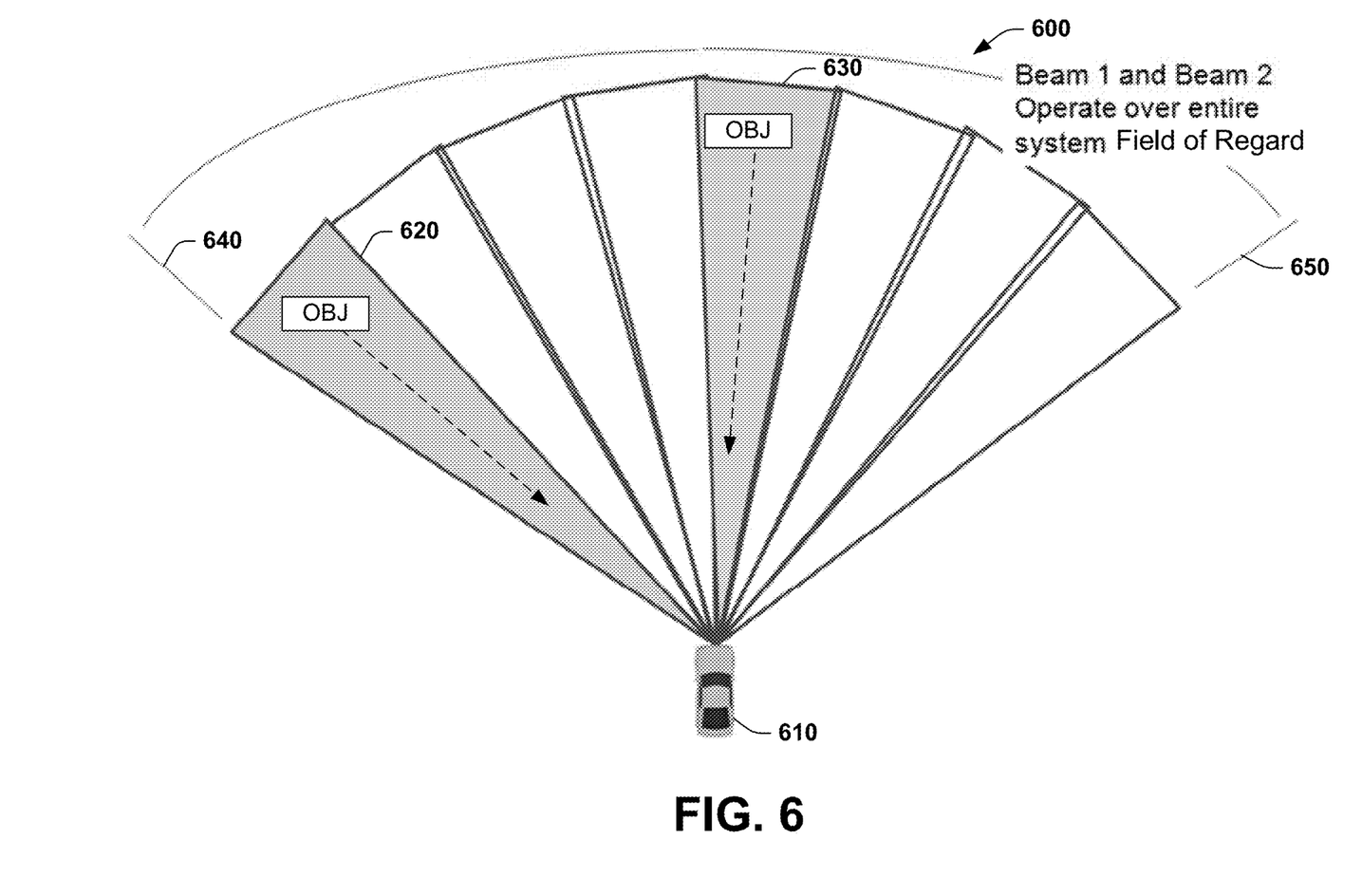
FIG. 6 illustrates an example of a transmitter and receiver multi-beam scanning pattern where each beam propagates and is received in a wide field of regard and one beam interrogates area within a field where an object has been detected.

FIG. 6 illustrates an example of a transmitter and receiver multi-beam scanning pattern 600 where each beam propagates and is received in a wide field of regard and one beam interrogates an area within a field view within the field of regard where an object has been detected. In this example, vehicle 610 having a receiver generates a first receive beam 620 and a second receive beam 630. Each beam can be separated in space by a predetermined number of dwell locations if desired where each beam scans the entire field of view beginning at 640 and ending at 650. If an object is detected within the field generated by either beam, the beam where the object was detected can be directed to point in the field of the detected object while the other beam can be directed to scan the entire field for other potential objects. In this manner, one beam can be stopped to focus on a detected object (or objects) while the other beam can continue to scan for objects that are outside of the field of the detected object. If more than two beam patterns are employed, two or more fields outside the field of the detected object can continue to scan the entire field while one of the beams remains fixed on the location of the detected object. If a subsequent object is detected, two of the receive beams can remained fixed on the detected object(s), while the remaining beam (or beams) scan the entire field for other objects. Dotted return arrows within the scanning beams represent signals that are received in response to the scanning beams being reflected from detected objects.

Figure 7:
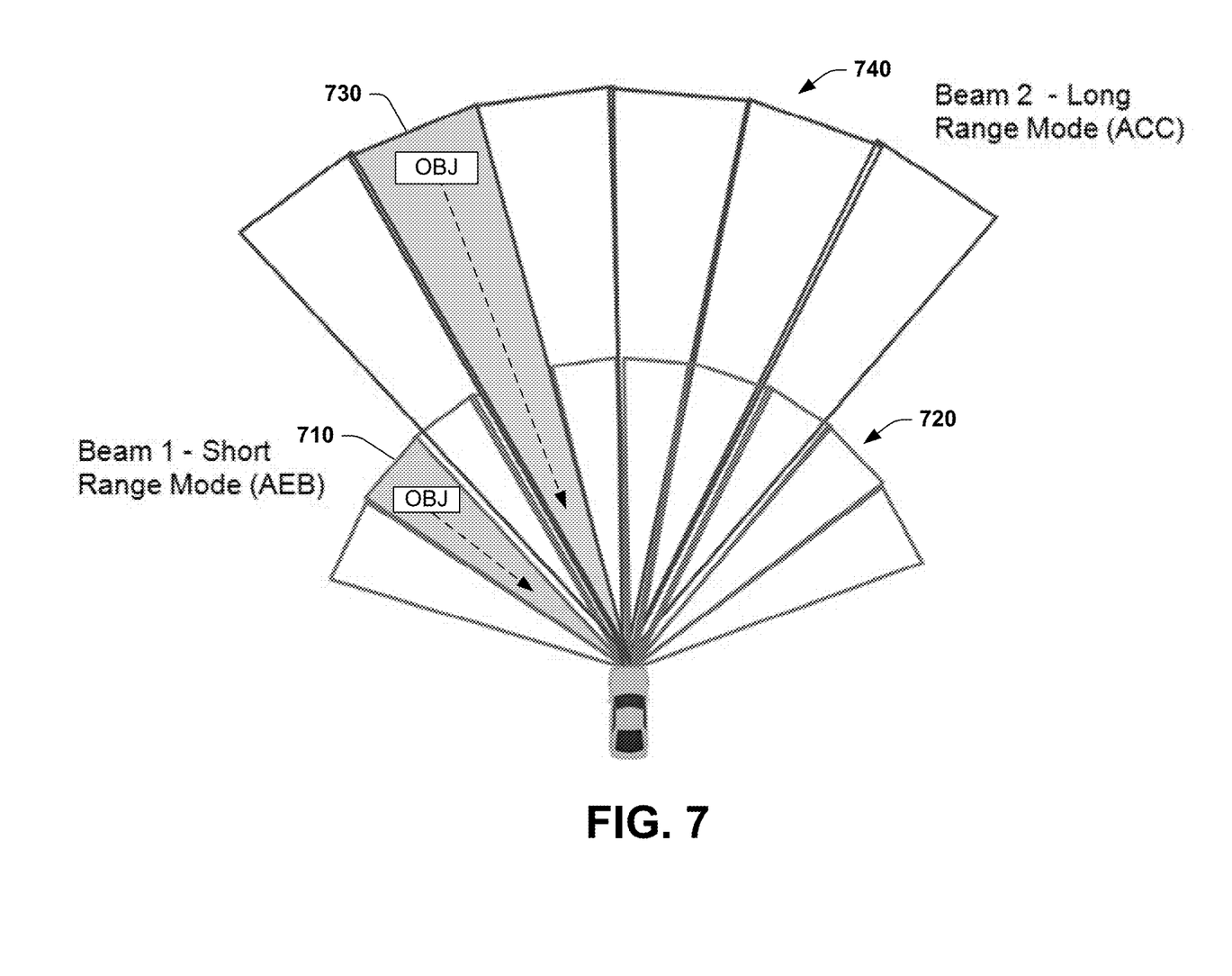
FIG. 7 illustrates an example of a transmitter and receiver multi-beam scanning pattern where one beam propagates and is received in a short range field of regard and another beam operates in a long range field of regard.

FIG. 7 illustrates an example of a transmitter and receiver multi-beam scanning pattern where one receive beam 710 propagates and is formed in a short range field of regard shown at 720 and another receive beam 730 operates and is formed in a long range field of regard shown at 740. As used herein, the term short range refers to any scanning distance that is less than the distance scanned by the long range field 740. Thus, if the short range field 720 was scanned at a maximum azimuth distance from a vehicle 750 of 100 feet, the long range field 740 would be scanned at a distance greater than 100 feet such as 200 feet for example. By utilizing separate scanning distances, different types of vehicle control applications can be optimized based on the respective distance. For example, in the short range field 720, objects detected in this range can initiate corrective actions for automated emergency breaking (AEB), for example. In the long range field 740, objects detected at this range can initiate an adaptive cruise control (ACC) application, for example. Dotted return arrows within the scanning beams represent signals that are received in response to the scanning beams being reflected from detected objects.

Figure 8:
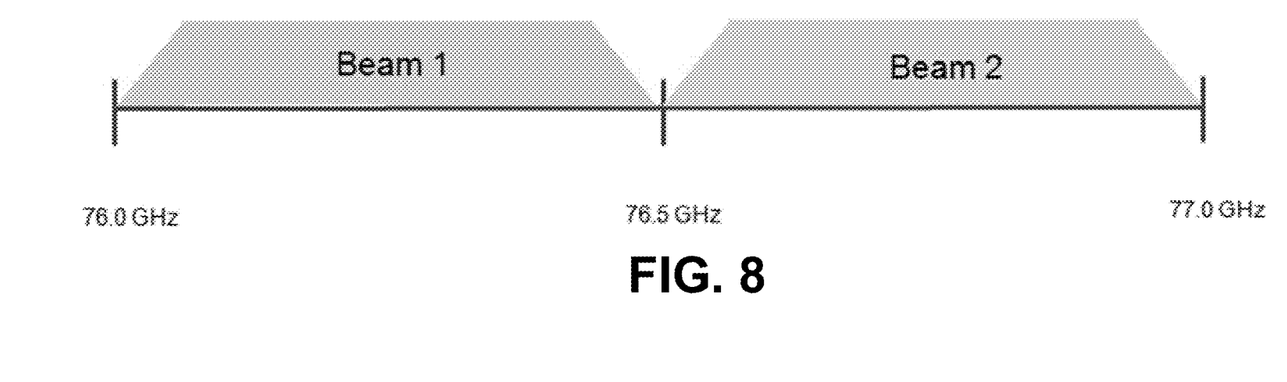
FIG. 8 illustrates an example of a transmitter and receiver multi-beam scanning pattern where each beam propagates and is received with a different scanning frequency.

FIG. 8 illustrates an example of a transmitter and receiver multi-beam scanning and receive pattern where each beam propagates and is received with a different scanning frequency. In this example, two beams are generated shown as beam 1 and beam 2. Beam 1 operates in a frequency range from about 76.0 GHz to about 76.5 GHz. Other frequency ranges are possible. In order to provide diversity with respect to Beam 2, Beam 2 can be generated in frequency range from about 76.5 GHz to about 77 GHz (or other frequency range). By driving each of the respective beams at different frequencies to provide frequency diversity between beams, information detected from the beams can be received at different frequencies thus avoiding interference and overlap between the beams.

Figure 9:
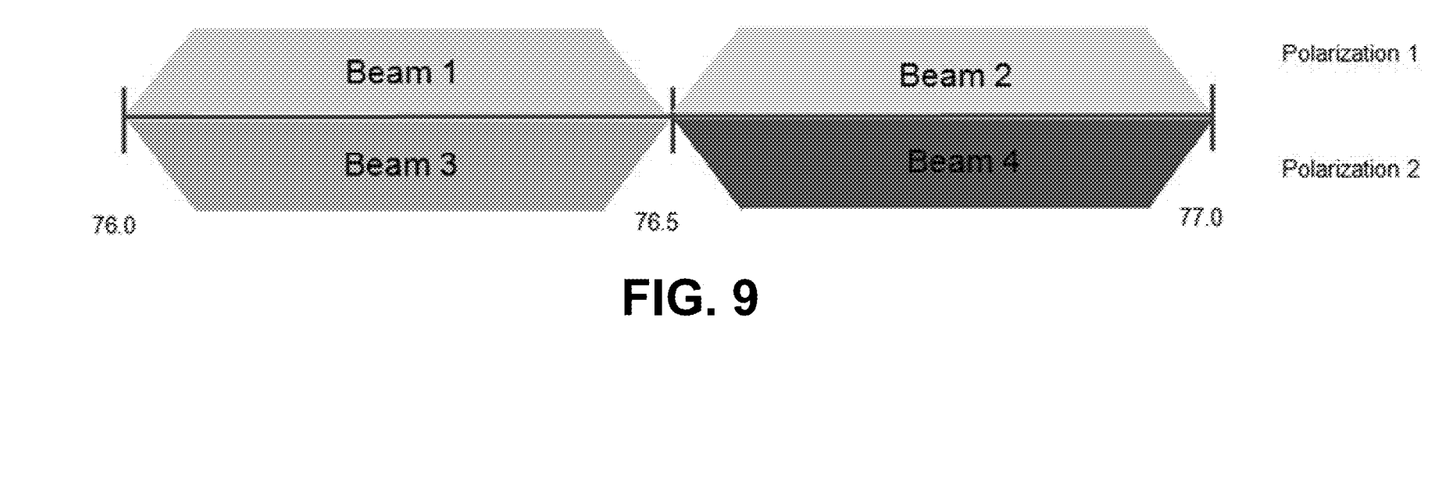
FIG. 9 illustrates an example of a transmitter and receiver multi-beam scanning pattern where beams propagate and are received with a different scanning frequency and polarization.

FIG. 9 illustrates an example of a transmitter and receiver multi-beam scanning and receive pattern where beams propagate and are received with a different scanning frequency and polarization. In this example, beams 1, 2, 3, and 4 are generated. Beams 1 and 3 are generated in a first frequency range from about 76.0 GHz to about 76.5 GHz and beams 2 and 4 can be generated in a second frequency range from about 76.5 GHz to about 77 GHz. To add additional diversity between beams, the respective beams can be generated using differing polarization transmit schemes. For example, Beams 1 and 2 can be generated using electrical field excitation and Beams 3 and 4 can be generated according to a different polarization utilizing magnetic field excitation, for example. The electric field and the magnetic field excitation are transverse with respect to each other and thus, by using differing polarization techniques for excitation, interference between beams can be further mitigated.

Figure 10:
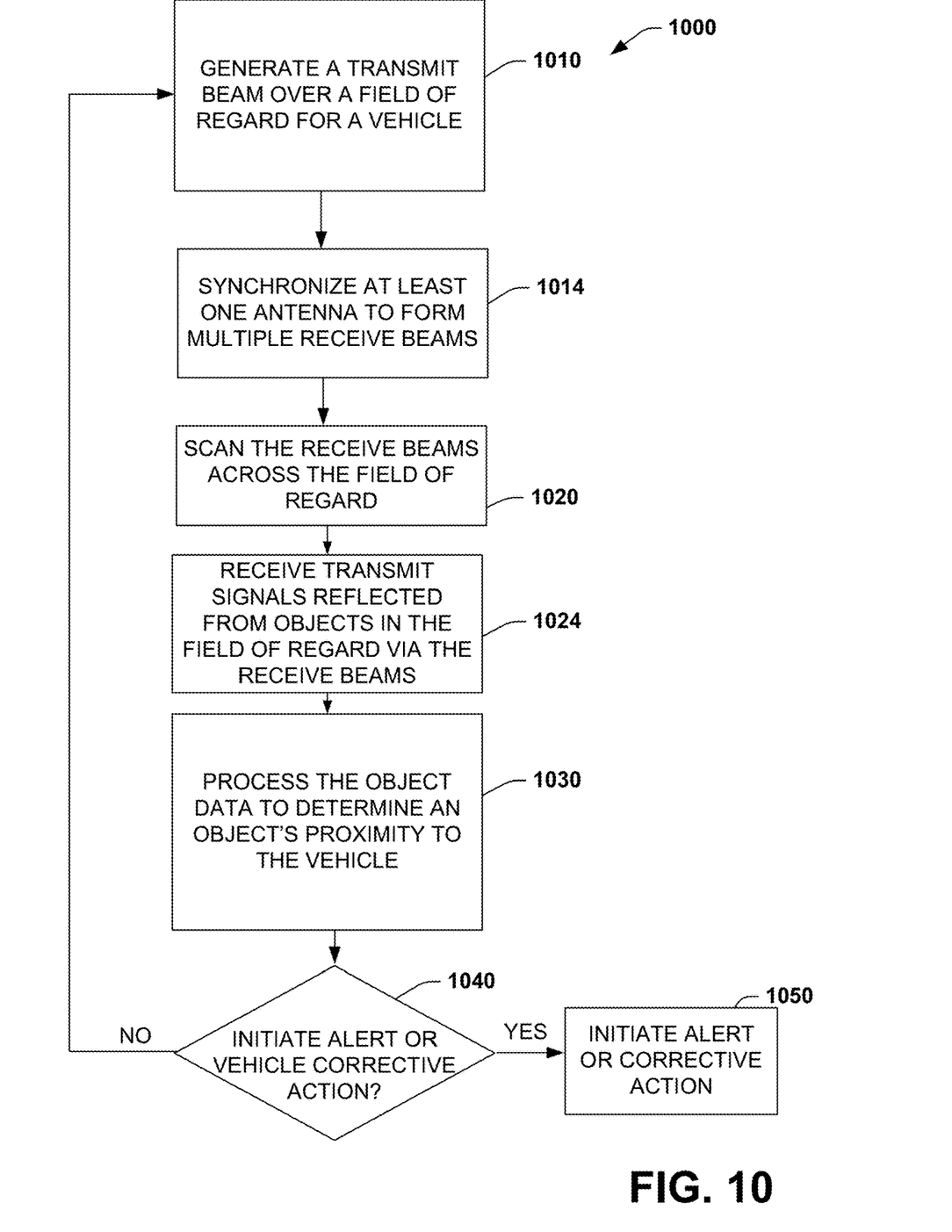
FIG. 10 illustrates an example of a multi-beam receiver method to facilitate object detection for a vehicle.

In view of the foregoing structural and functional features described above, an example method will be better appreciated with reference to FIG. 10. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 10 illustrates an example of a multi-beam transmitter method 1000 to facilitate object detection for a vehicle. At 1010, the method 100 includes generating a transmit beam over a field of view for a vehicle in response to a beam command (e.g., via beam generator 240 of FIG. 2). At 1014, the method 100 includes synchronizing at least one antenna to form multiple receive beams in response to a beam command (e.g., via synchronizer 244 of FIG. 2). The receive beams have a field of view narrower than the field of regard covered by a Radio Detection and Ranging (RADAR) system. At 1020, the method 1000 includes scanning the receive beams across the field of regard (e.g., via receiver 270 of FIG. 2). At 1024, the method 100 includes receiving transmit signals reflected from objects in the field of regard via the receive beams (e.g., via receiver 270 of FIG. 2). At 1030 of FIG. 3, the method 1000 includes processing the object data to determine an object's angular position in the field of regard and proximity to the vehicle (e.g., via controller 210 of FIG. 2). At 1040, a decision is made as to whether or not to initiate an alert or a vehicle corrective action for the vehicle if the object's proximity to the vehicle is determined within a predetermined proximity threshold (e.g., detected object within 100 feet of vehicle). If a detected object is within proximity at 1040, the method 1000 proceeds to initiate an alert (e.g., sound or message to driver) or corrective action (e.g., automatically cause vehicle to adjust) at 1050. If no objects are detected at 1040, the method proceeds back to 1010 for subsequent scanning and detection. Although not shown, the method 1000 can also include scanning each of the multiple receive beams in different regions of the field of regard.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
a controller comprising a processor and a memory, the processor configured to execute computer-executable instructions stored in the memory to operate the controller, the instructions configured to cause the controller to:
determine at least two beam patterns for separate scanning receive beams that operate within a field of regard to be scanned by a Radio Detection and Ranging (RADAR), the separate scanning receive beams comprising first and second scanning receive beams each having a respective beamwidth and dwell time, wherein the beamwidth of the first scanning receive beam is wider than the beamwidth of the second scanning receive beam and the dwell time of the first scanning receive beam is longer than the dwell time of the second scanning receive beam to allow the system to operate concurrently in a long-range mode and a short-range mode; and
generate beam pattern commands to form the separate scanning receive beams based on the determined beam patterns, the beam pattern commands specifying an azimuth beam width and a pointing direction for each of the separate scanning receive beams that operate within each portion of the field of regard.

2. The system of claim 1, further comprising a receiver and at least one antenna configured to form the scanning receive beams and to receive signals reflected by an object illuminated by a RADAR transmitter.

3. The system of claim 2, wherein the at least one antenna includes at least one phased antenna array configured to form the receive beams and receive signals reflected by an object illuminated by the RADAR transmitter.

4. The system of claim 3,
wherein the phased antenna array is configured to utilize separate antenna arrays to form the receive beams, the separate antenna arrays comprising:
a first single antenna array having antenna sub-arrays within the first single antenna array to form the receive beams, and
a second single antenna array configured to receive progressive phase weight commands as the direction commands that are applied to each element of the second single antenna array to form the receive beams, or
wherein the phased antenna array utilizes an antenna array where digital beam forming commands are applied to the array to form the receive beams.

5. The system of claim 4, wherein the system is configured to apply the progressive phase weight commands to each element of the first or second single antenna array to provide a beam forming network (BFN) to form a plane wave at a face of the antenna aperture of the single antenna array to cause each of the receive beams to be formed such that signals reflected from an object are received in a known direction.

6. The system of claim 5, wherein the system is configured to form a parallel BFN to receive a subsequent beam utilizing a different set of progressive weight commands that are summed at each element of the single antenna array.

7. The system of claim 6, wherein the signal from at least one receive beam is processed and transmitted to a vehicle corrective action processor in an automobile to initiate a vehicle corrective action, wherein the vehicle corrective action initiates at least one of an Automated Emergency Braking (AEB) application to stop or slow a vehicle in response to the vehicle corrective action, an Automated Emergency Steering (AES) application to steer the vehicle in response to the vehicle corrective action, an Adaptive Cruise Control (ACC) application to adjust a cruising speed for the vehicle in response to the vehicle corrective action, Collision Warning (CW) application to warn an operator of the vehicle in response to the vehicle corrective action, a Lane Departure Warning (LDW) application to warn the operator of a detected lane change for the vehicle in response to the vehicle corrective action, an a Lane Keeping Assist (LKA) application to help the vehicle maintain a given lane in response to the vehicle corrective action.

8. The system of claim 6, wherein the receiver is synchronized via a controller to scan the receive beams across the field of regard by forming each of the receive beams at an initial position and dwell at the initial position for a length of time specified by the controller, where each receive beam is then moved to a new location and dwell for a length of time specified by the controller, and successively moved to other positions until each of the scanning receive beams have covered the field of regard.

9. The system of claim 6, wherein the first and second scanning receive beams are configured to scan across sub-regions of the field of regard.

10. The system of claim 6, wherein the receiver is configured to receive signals from separate transmit beams, and wherein the transmit beams are at different frequencies to mitigate interference between the transmit beams.

11. The system of claim 6, wherein the controller is configured to initiate, based on the system detecting an object at a position within the field of regard scanned by the scanning receive beams, a subsequent beam interrogation at about the location of the detected object.

12. A system, comprising:
a beam generator for a vehicle that transmits a transmit beam over a scanning region of a field of regard in response to a beam command;
a controller for the vehicle to generate the beam command to the beam generator to cause the transmit beam to be directed across the field of regard, the transmit beam to reflect from objects within proximity of the vehicle; and
a synchronizer to generate beam forming commands to at least one antenna to form a plurality of receive beams and to synchronize the receive beams to the transmit beam, the beam forming commands specify a beam width and receiving direction for the beams formed by the at least one antenna, the plurality of receive beams comprising first and second receive beams each having a respective beamwidth and dwell time, wherein the beamwidth of the first receive beam is wider than the beamwidth of the second receive beam and the dwell time of the first receive beam is longer than the dwell time of the second receive beam to allow the system to operate concurrently in a long-range mode and a short-range mode.

13. The system of claim 12, further comprising at least one phased antenna array configured to generate the transmit beam or form the receive beams that are generated or received as Radio Detection And Ranging (RADAR) beams.

14. The system of claim 13,
wherein the at least one phased antenna array is configured to utilize separate antenna arrays to generate or form the transmit or receive beams in response to the beam command, the separate antenna arrays comprising:
a first single antenna array having antenna sub-arrays within the first single antenna array to generate or form the transmit or receive beams in response to the beam command, and
a second single antenna array configured to receive progressive phase weight commands as the beam command that are applied to each element of the single antenna array to generate the transmit beam or receive the receive beams, or utilizes an antenna array where digital beam forming commands are applied to the array to generate the receive beams or the transmit beam.

15. The system of claim 14, further comprising at least one receiver to receive reflected RADAR signals from objects in the field of regard, the receiver receives the reflected RADAR signal via a separate receive antenna or via the at least one phased antenna array, the receiver notifies the controller of detected objects in the field of regard to enable the controller to communicate with one or more automobile controllers to initiate a vehicle corrective action for the vehicle.

16. The system of claim 15, wherein the receiver is synchronized via a controller to scan the receive beams across the field of regard by forming each of the receive beams at an initial position and dwell at the initial position for a length of time specified by the controller, where the beam is then moved to a new location and dwell for a length of time specified by the controller, and successively moved to other positions until each of the receive beams have covered the field of regard.

17. A method, comprising:
generating a transmit beam over a field of regard for a vehicle in response to a beam command;
synchronizing at least one antenna to form multiple receive beams in response to a beam command, the receive beams individually each having a field of view narrower than the field of regard covered by a Radio Detection and Ranging (RADAR) system in the vehicle, the multiple receive beams comprising first and second receive beams each having a respective beamwidth and dwell time, wherein the beamwidth of the first receive beam is wider than the beamwidth of the second receive beam and the dwell time of the first receive beam is longer than the dwell time of the second receive beam to allow the RADAR system to operate concurrently in a long-range mode and a short-range mode;
scanning the receive beams across the field of regard;
receiving transmit signals reflected from objects in the field of regard via the receive beams;
processing the object data to determine an object's angular position in the field of regard and proximity to the vehicle; and
initiating an alert to the driver or initiating a vehicle corrective action for the vehicle based on determining the object's proximity to the vehicle to be within a proximity threshold.

18. The method of claim 17, further comprising scanning each of the multiple receive beams in different regions of the field of regard.

* * * * *